(12) United States Patent
Ogata et al.

(10) Patent No.: US 6,489,757 B2
(45) Date of Patent: Dec. 3, 2002

(54) OPTICAL INTERFACE WITH LOW-VOLTAGE RELAY UNIT AND HIGH-VOLTAGE REGULATION UNIT

(75) Inventors: Masaaki Ogata, Kyoto (JP); Eiji Yokoyama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/978,062

(22) Filed: Oct. 17, 2001

(65) Prior Publication Data

US 2002/0043967 A1 Apr. 18, 2002

(30) Foreign Application Priority Data

Oct. 18, 2000 (JP) ......................... 2000-317617

(51) Int. Cl.[7] ............... H02H 7/122; H02M 7/68
(52) U.S. Cl. .................. 323/284; 323/907; 363/56; 363/97
(58) Field of Search ................... 323/907, 284; 363/56, 97, 131

(56) References Cited

U.S. PATENT DOCUMENTS

| | | | | |
|---|---|---|---|---|
| 4,962,292 A | * | 10/1990 | Aoki ........................... 363/97 |
| 5,559,422 A | * | 9/1996 | Fahrenkrug et al. ........ 323/221 |
| 5,995,382 A | * | 11/1999 | Miyazaki et al. ............. 363/19 |
| 5,995,384 A | * | 11/1999 | Majid et al. .................. 363/56 |
| 6,137,696 A | * | 10/2000 | Hall et al. .................... 363/97 |
| 6,188,584 B1 | * | 2/2001 | Arai et al. .................... 363/56 |

* cited by examiner

*Primary Examiner*—Bao Q. Vu
(74) *Attorney, Agent, or Firm*—Michael D. Bednarek; Shaw Pittman LLP

(57) ABSTRACT

A photocoupler includes a signal relay unit, a voltage regulation unit and a signal amplification unit. The signal relay unit transmits an optical signal from the primary side to the secondary side. The voltage regulation unit applies only a safe voltage to the signal relay unit. The voltage regulation unit has a greater withstand voltage than the signal relay unit has. The signal amplification unit amplifies signals sent from the signal relay unit. The withstand voltage of the signal amplification unit is also greater than that of the signal relay unit.

7 Claims, 3 Drawing Sheets

OPTICAL INTERFACE WITH LOW-VOLTAGE RELAY UNIT AND HIGH-VOLTAGE REGULATION UNIT

BACKGROUND OF THE INVENTION

1. Field of the Invention:

The present invention generally relates to a high-voltage interface. In particular, it relates to a photocoupler that withstands a high voltage used for home electric appliances.

2. Description of the Related Art:

One of the most popular home electric appliances may be an air conditioner. Referring to FIG. 1, typically an air conditioning system includes an internal unit 1 and an external unit 2. Though not depicted, the external unit 2 may include a compressor, a fan, and other necessary components. The driving power for the external unit 2 is supplied from the internal unit 1 via a power cable 3. As illustrated, the power cable 3 includes a pair of conductive lines 3a and 3b which are insulated from each other. An alternating current of 100V may be carried by the power cable 3.

In addition to the power cable 3, a single conductive line 4 is used between the internal unit 1 and the external unit 2. The conductive line 4 transmits control signals to manage the operation of the external unit 2. For economy of the system, the power line 3b is also used for transmitting the control signals (thus, the power line 3b works as both power transmitter and control signal transmitter).

To properly operate the movable components in the external unit 2 (i.e. the compressor, the fan, etc.), the control signals supplied to the unit 2 should be free from electrical noise. To achieve this, use may be made of an interface (I/F) such as a photocoupler. The interface provided in the internal unit 1 is connected to the power line 3b and the control signal line 4.

FIG. 2 shows the principal components used in a conventional photocoupler PC1'. In the photocoupler PC1', a photodiode PD1' is provided on the primary side, while a phototransistor PT1' and a transistor TR1' are provided on the secondary side. The collectors of the respective transistors PT1' and TR1' are connected to a first output terminal, while the emitters of the respective transistors PT1' and TR1' are connected to a second output terminal. The first output terminal is connected to the power line 3b (FIG. 1), while the second output terminal to the control signal line 4.

In operation, an unduly high voltage may be applied to the two transistors PT1' and TR1' via the power line 3b. Thus, as aprecaution, the transistors PT1' and TR1' need to be designed as a high voltage device. In general, however, a high-voltage transistor tends to exhibit poor switching characteristics (i.e. slow response) due to the collector-base junction capacitance. This is disadvantageous because the interface using the high-voltage phototransistor PT1' may fail to transmit the control signals properly.

The above problem may be overcome by providing an electrical connection between the base of the phototransistor PT1' and the output terminal 2. With such a connection, the unfavorable charge appearing between the collector and the base of the phototransistor PT1' will be eliminated.

The above scheme, however, will cause another problem. Specifically, for making a connection between the transistor PT1' and the output terminal 2, an additional step is required. Due to this, the circuit layout of FIG. 3 will cost more than that of FIG. 2. Accordingly, the product photocoupler adopting the layout of FIG. 3 becomes expensive.

SUMMARY OF THE INVENTION

The present invention has been proposed under the circumstances described above. It is, therefore, an object of the present invention to provide an interface which has quick response and high withstand voltage, and which can be produced at a low cost.

According to the present invention, there is provided an interface which includes: a signal relay unit that transmits a signal from a primary side to a secondary side; and a voltage regulation unit that applies to the signal relay unit a voltage which is lower than a predetermined threshold, wherein the voltage regulation unit has a greater withstand voltage than the signal relay unit has.

Preferably, the signal relay unit includes a photodiode that emits light and a phototransistor that detects said light.

Preferably, the signal relay unit includes a protection package that encloses the photodiode and the phototransistor.

Preferably, the voltage regulation unit includes a first high-voltage transistor and a zener diode, wherein the first high-voltage transistor has a higher withstand voltage than the phototransistor has, and wherein the zener diode is connected in parallel to the phototransistor.

Preferably, the interface of the present invention further includes a signal amplification unit that amplifies a signal supplied from the signal relay unit.

Preferably, the signal amplification unit includes a second high-voltage transistor connected to the phototransistor of the signal relay unit, wherein the second high-voltage transistor has a greater withstand voltage than the phototransistor has.

Preferably, the phototransistor and the second high-voltage transistor provide, in combination, a Darlington transistor.

Preferably, the signal amplification unit includes a resistor which is disposed between the base and the emitter of the second high-voltage transistor.

Other features and advantages of the present invention will become apparent from the detailed description given below with reference to the accompanying drawings.

DETAILED DESCRIPTION OF THE PREFERRED EMBODIMENT

The preferred embodiment of the present invention will be described below with reference to the accompanying drawings.

Figure 1:
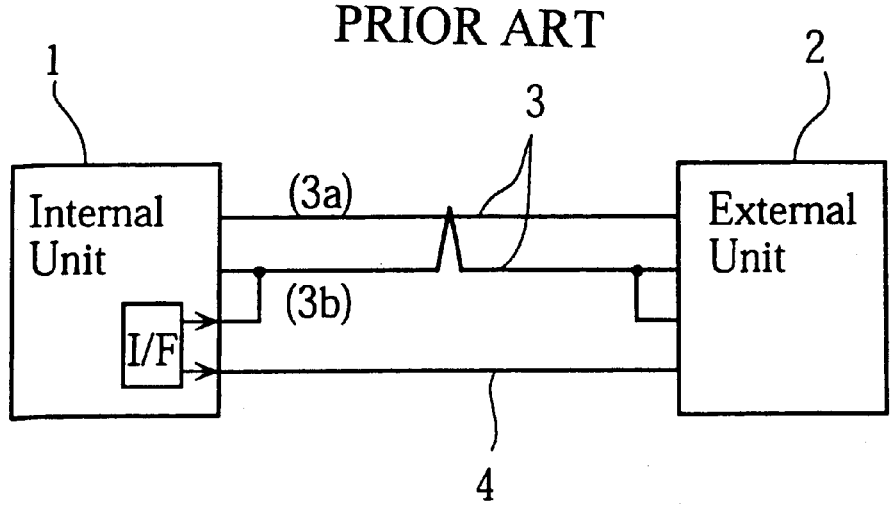
FIG. 1 shows the overall configuration of an air conditioning system used commonly by the prior art and the present invention.
Figure 2:
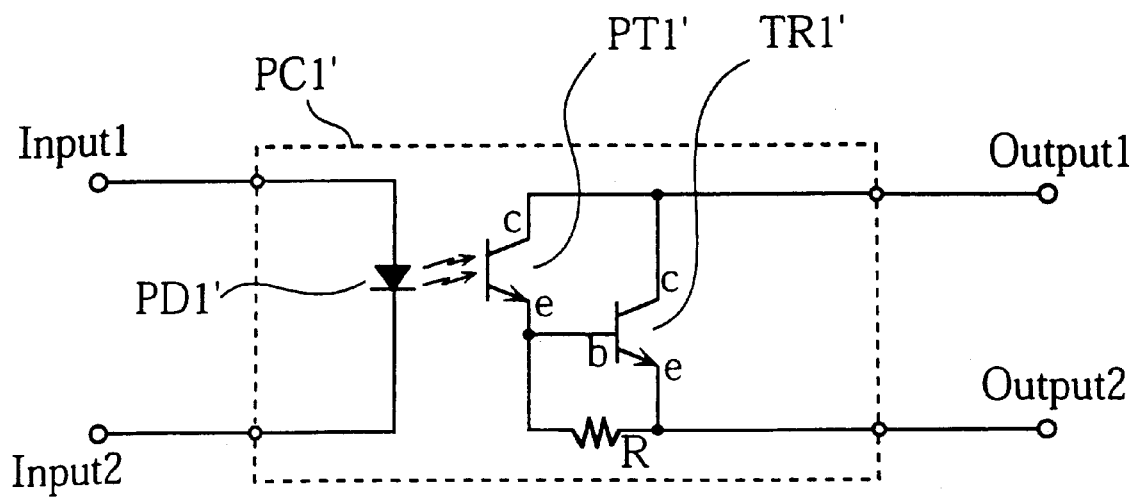
FIG. 2 shows a circuit layout of a conventional photocouplier.
Figure 3:
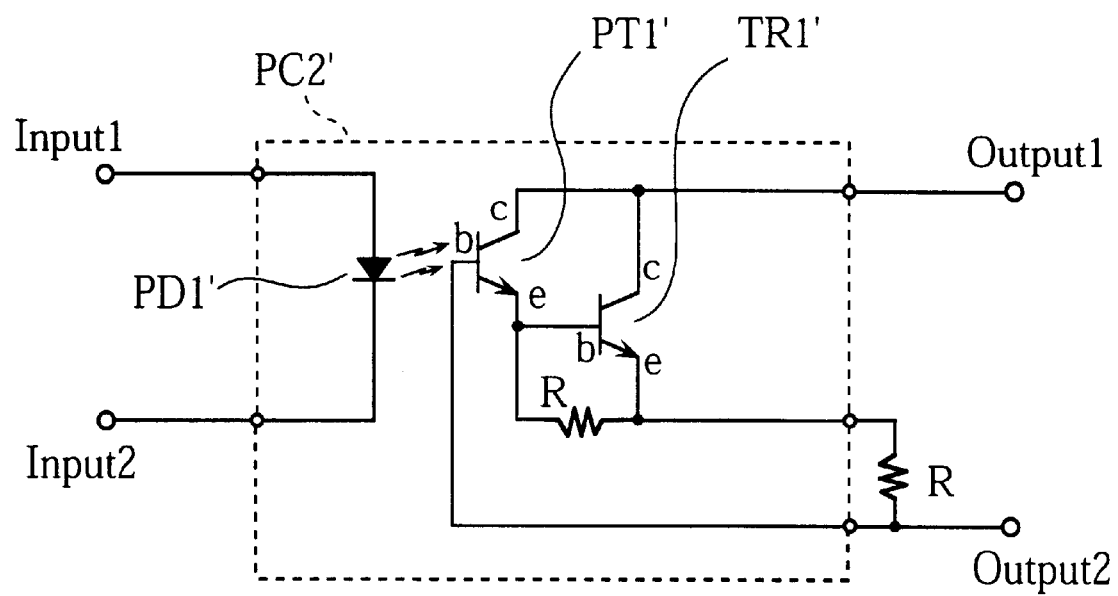
FIG. 3 shows a modified circuit layout of a conventional photocoupler.

FIG. 1 schematically shows the principal components of a home electric appliance to which an interface circuit according to the present invention is applied. In the illustrated example, the electric appliance is an air conditioning system including an internal unit 1 and an external unit 2. The external unit 2 is provided with a compressor, a fan, etc (not shown). The power required for driving the external unit 2 is supplied from the internal unit 1 through a power cable 3 consisting of first and second power lines 3a and 3b. In addition to the power cable 3, a single control signal line 4 is provided between the internal unit 1 and the external unit 2. As in the case of the prior art system noted above, use is made of the control signal line 4 and the second power line 3b for transmitting control signals to operate the external unit 2. The effective driving voltage of the supplied power may be 100V (AC).

The internal unit 1 is provided with an interface (I/F) to properly transmit control signals to the external unit 2. In the illustrated example, the interface is a photocoupler PC shown in FIG. 4. Functionally, the photocoupler PC can be divided into three units: a signal relay unit 5, a voltage regulation unit 6 and a signal amplification unit 7.

The signal relay unit 5 is provided for conveying various kinds of signals or data supplied from a controller (not shown) of the internal unit 1, to a circuit arranged on the secondary side of the relay. To this end, the relay unit 5 includes a photodiode PD on the primary side and a phototransistor PT on the secondary side. The phototransistor PT is designed as a low-voltage transistor, so that it has excellent switching characteristics (i.e. quick response). The photodiode PD is connected to first and second input terminals 8a and 8b. The phototransistor PT is electrically insulated from the photodiode PD. As is known in the art, the insulation is advantageous to excluding electrical noise from the signals to be conveyed. The photodiode PD and the phototransistor PT are enclosed in a common protection package (dashed lines) which may be made of resin. When signals are inputted via the two input terminals 8a and 8b, the photodiode PD emits light to the phototransistor PT.

Upon receiving the light, the phototransistor PT is turned on.

The voltage regulation unit 6 permits only a safe (i.e. sufficiently low) voltage to be applied to the signal relay unit 5. To achieve this, the regulation unit 6 includes a first transistor Q1, a zener diode ZD and a resistor R1. Specifically, the collector of the first transistor Q1 is connected to a first output terminal 9a, and the emitter is connected to the collector of the phototransistor PT. The base of the transistor Q1 is connected to the cathode of the zener diode ZD and to one end of the resistor R1. The other end of the resistor R1 is connected to the first output terminal 9a, while the anode of the zener diode ZD is connected to the second output terminal 9b. The zener diode ZD, the first transistor Q1 and the resistor R1 are enclosed by a resin package separate from the above-mentioned protection package of the signal relay unit 5.

Figure 4:
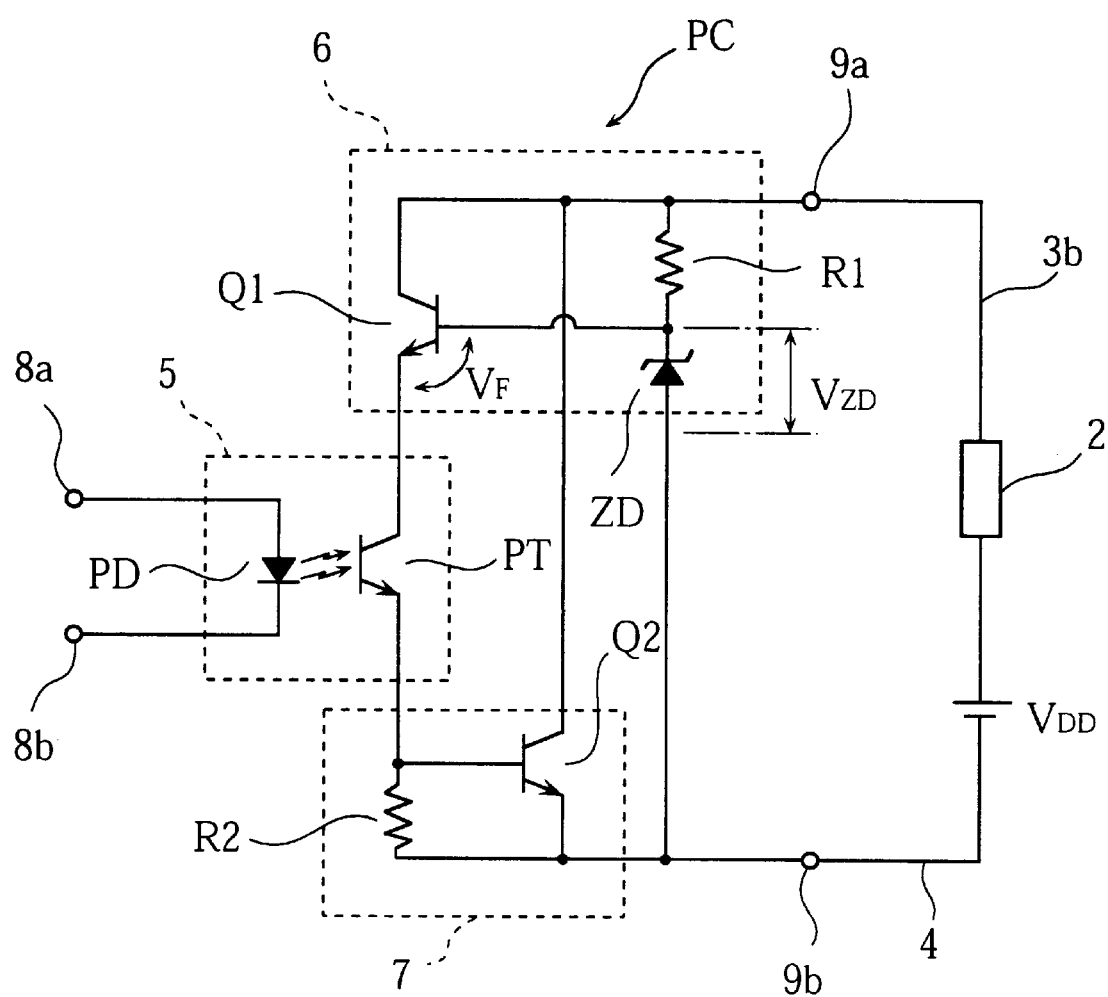
FIG. 4 shows a layout of an interface embodying the present invention.

As shown in FIG. 4, the second output terminal 9b is connected to the second power line 3b of the power cable 3 (see also FIG. 1). Thus, the transistor Q1, which is connected to the terminal 9b, is designed as a high-voltage transistor so that it can withstand a voltage of 100V for example.

The signal amplification unit 7 includes a second transistor Q2 for amplifying signals, and a resistor R2 for improving the switching characteristics of the second transistor Q2. Specifically, the base of the transistor Q2 is connected to the emitter of the phototransistor PT. The collector and the emitter of the transistor Q2 are connected to the first output terminal 9a and the second output terminal 9b, respectively. The resistor R2 is arranged between the base and the emitter of the transistor Q2. The second transistor Q2 and the resistor R2 are enclosed by a third protection package separate from the above-mentioned 41 packages for the units 5 and 6.

The second transistor Q2 is turned on and off, in accordance with the signals supplied from the signal relay unit 5. When the transistor Q2 is turned on, the first and the second output terminals 9a, 9b are connected. The collector of the transistor Q2 is connected to the first output terminal 9a (and hence the second power line 3b). Thus, the second transistor Q2 also needs to be designed as a high-voltage transistor.

The operations of the photocoupler PC will now be described below with reference to FIG. 4.

Consideration is first given to the case where there is no signal input at the terminals 8a and 8b. Due to the driving voltage $V_{DD}$ for the components of the external unit 2, a certain voltage is applied to the phototransistor PT of the unit 5 via the voltage regulation unit 6 (the driving voltage $V_{DD}$ may be set at a value between 20–100V for example). Precisely, a bias current is applied to the base of the first transistor Q1, which holds the transistor Q1 in On-state. Accordingly, a voltaget of $(V_{ZD}-V_F)$ is applied to the collector of the phototransistor PT, where $V_{ZD}$ is the breakdown voltage of the zener diode ZD, and $V_F$ is the base-emitter voltage of the first transistor Q1. In this manner, the phototransistor PT is protected from the application of a voltage greater than the voltage $V_{ZD}$.

The collector-emitter withstand voltage of the phototransistor PT should be greater than the breakdown voltage $V_{ZD}$ of the zener diode ZD. In the illustrated embodiment, the voltage $V_{ZD}$ is in a range of 1–9 volts. The first and the second transistors Q1, Q2 need to have a much greater withstand voltage than the phototransistor PT, since the first output terminal 9a is connected to the power cable 3 carrying AC100V.

When signals are inputted at the terminals 8a and 8b, the photodiode PD is activated to emit light, which turns on the phototransistor PT. As a result, electric current flows into the base of the second transistor Q2, thereby turning on the second transistor Q2. Upon the activation of the transistor Q2, the first and the second output terminals 9a, 9b are short-circuited, whereby the required signals are transmitted to the external unit 2. At this stage, a voltage of $\{V_{DD}-(V_{ZD}-V_F)\}$ is applied to the first transistor Q1.

The combination of the phototransistor PT and the second transistor Q2 provides a Darlington transistor, whereby the current amplification is improved. Further, since the base and the emitter of the second transistor Q2 are connected via the resistor R2, the unfavorable charge built up at the base of the transistor Q2 can be discharged through the output terminal 9b. This is advantageous to improving the switching characteristics of the transistor Q2.

Still further, according to the above embodiment, the phototransistor PT of the signal relay unit 5 does not need to be provided with an additional discharge path connected to the base (see the prior art), since the phototransistor PT has a relatively low withstand voltage (meaning that the phototransistor PT has quick switching characteristics). Thus, the production of the signal relay unit 5 is performed at a low cost.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

What is claimed is:

1. An interface comprising:
   a signal relay unit that transmits a signal from a primary side to a secondary side, the signal relay unit including a photodiode to emit light and a phototransistor to detect said light; and a voltage regulation unit for providing the signal relay unit with a voltage lower than a predetermined threshold, the voltage regulation unit including a first high-voltage transistor and a zener diode, the first high-voltage transistor being connected to the phototransistor and the zener diode;

wherein the first high-voltage transistor has a higher withstand voltage than the phototransistor has.

2. The interface according to claim 1, wherein the signal relay unit includes a protection package that encloses the photodiode and the phototransistor.

3. The interface according to claim 1, further comprising a signal amplification unit that amplifies a signal supplied from the signal relay unit.

4. The interface according to claim 3, wherein the signal amplification unit includes a second high-voltage transistor connected to the phototransistor of the signal relay unit, the second high-voltage transistor having a greater withstand voltage than the phototransistor has.

5. The interface according to claim 4, wherein the phototransistor and the second high-voltage transistor in combination provide a Darlington transistor.

6. The interface according to claim 4, wherein the second high-voltage transistor has a base and an emitter, the signal amplification unit including a resistor connected between said base and said emitter.

7. The interface according to claim 1, wherein the first high-voltage transistor and the phototransistor are provided on the secondary side of the signal relay unit.

* * * * *